US012784251B2

(12) United States Patent
Ho et al.

(10) Patent No.: US 12,784,251 B2
(45) Date of Patent: Nov. 3, 2026

(54) POSITIONING SYSTEM BASED ON AN IMAGE CAPTURING MODULE WITHIN A RECEIVER

(71) Applicants: HUAWEI TECHNOLOGIES CO., LTD., Shenzhen (CN); THE UNIVERSITY OF ADELAIDE, Adelaide (AU)

(72) Inventors: Siu Wai Ho, South Australia (AU); Sunil Kumar Atmaram Chomal, Singapore (SG); Zhan Yu, Singapore (SG); Matthew Scott Britton, South Australia (AU)

(73) Assignees: Huawei Technologies Co., Ltd, Shenzhen (CN); THE UNIVERSITY OF ADELAIDE, Adelaide (AU)

( * ) Notice: Subject to any disclaimer, the term of this patent is extended or adjusted under 35 U.S.C. 154(b) by 484 days.

(21) Appl. No.: 18/338,995

(22) Filed: Jun. 21, 2023

(65) Prior Publication Data

US 2023/0342971 A1 Oct. 26, 2023

Related U.S. Application Data

(63) Continuation of application No. PCT/CN2021/139347, filed on Dec. 17, 2021.

(30) Foreign Application Priority Data

Dec. 21, 2020 (SG) ........................... 10202012843X

(51) Int. Cl.

*G06K 9/36* (2006.01)
*G01C 21/20* (2006.01)

(Continued)

(52) U.S. Cl.

CPC .............. *G06T 7/70* (2017.01); *G01C 21/206* (2013.01); *G01S 1/7032* (2019.08); *G01S 3/782* (2013.01);

(Continued)

(58) Field of Classification Search

CPC ........... G06T 7/0004; G06T 7/30; G06T 7/50; G06T 7/60; G06T 7/62; G06T 7/70;

(Continued)

(56) References Cited

U.S. PATENT DOCUMENTS 9,939,275 B1 4/2018 Salehi et al.
10,746,551 B2 * 8/2020 Ishigami ................. G01S 19/49

(Continued)

FOREIGN PATENT DOCUMENTS

WO 2015173024 A1 11/2015

OTHER PUBLICATIONS

Phat Huynh and Myungsik Yoo, "VLC-Based Positioning System for an Indoor Environment Using an Image Sensor and an Accelerometer Sensor", Sensors, vol. 16, Issue 6, pp. 1-16, 2016 (Year: 2016).*

(Continued)

*Primary Examiner* — Eric Rush
(74) *Attorney, Agent, or Firm* — Leydig, Voit & Mayer, Ltd.

(57) ABSTRACT

A system is provided for determining a location of a receiver in an enclosed space whereby its location is obtained based on information associated with at least two transmitters that are provided within the enclosed pace. In particular, once the images of the transmitters are captured by an image capturing module provided within the receiver, the receiver is configured to process the captured image, and based on the outcome of this process, to determine its location in the enclosed space.

20 Claims, 2 Drawing Sheets

(51) Int. Cl.
*G01S 1/70* (2006.01)
*G01S 3/782* (2006.01)
*G01S 17/06* (2006.01)
*G06T 7/62* (2017.01)
*G06T 7/70* (2017.01)
*G06T 7/73* (2017.01)
*G06T 7/77* (2017.01)
*G06V 10/75* (2022.01)

(52) U.S. Cl.
CPC ................ *G01S 17/06* (2013.01); *G06T 7/62* (2017.01); *G06T 7/73* (2017.01); *G06T 7/77* (2017.01); *G06V 10/757* (2022.01); *G06T 2207/30244* (2013.01)

(58) Field of Classification Search
CPC .... G06T 7/73; G06T 7/74; G06T 7/75; G06T 7/77; G06T 2207/10004; G06T 2207/10024; G06T 2207/30244; G06V 10/44; G06V 10/46; G06V 10/464; G06V 10/469; G06V 10/476; G06V 10/70; G06V 10/75; G06V 10/751; G06V 10/7515; G06V 10/757; G01S 1/00; G01S 1/70; G01S 1/7032; G01S 3/782; G01S 5/00; G01S 5/01; G01S 5/013; G01S 5/018; G01S 5/16; G01S 5/163; G01S 17/00; G01S 17/02; G01S 17/06; G01S 17/42; G01S 17/46; G01S 17/66; G01C 21/04; G01C 21/06; G01C 21/20; G01C 21/206; G01C 21/3844; G01C 21/3848; H04B 10/114; H04B 10/1141; H04B 10/116; H04B 10/50; H04B 10/516; G05D 1/00; G05D 1/02; G05D 1/021; G05D 1/0231; G05D 1/0234; G05D 1/0242; G05D 1/0246; G05D 1/0268; G05D 1/027; G05D 1/0274; G05D 1/0276
USPC ....... 382/100, 103, 104, 106, 107, 151–153, 382/201, 203, 209, 224, 225, 276, 282, 382/285, 287, 291–296, 312, 313, 325; 348/61, 113, 116, 118, 135, 141–143, 348/158, 161, 169–172; 356/3, 3.01, 356/4.01, 388, 392–394, 396–398, 614, 356/620, 622–624; 701/300, 400, 408, 701/472, 482, 513, 523, 526, 540, 541
See application file for complete search history.

(56) References Cited

U.S. PATENT DOCUMENTS 11,964,401 B2 * 4/2024 Wang ................... G05D 1/0246
2010/0017124 A1 * 1/2010 Zhao ......................... G06T 7/73 382/106
2014/0084050 A1 3/2014 Calvarese et al.
2014/0093249 A1 * 4/2014 Roberts ..................... G01S 5/16 398/127
2014/0198227 A1 * 7/2014 Mohammad Mirzaei .................. G06V 10/242 348/208.2
2016/0357189 A1 * 12/2016 Barrows ................... G01S 5/16
2017/0142809 A1 * 5/2017 Paolini ................... H05B 47/19
2018/0348338 A1 * 12/2018 Li ............................ G01S 5/16
2018/0350098 A1 * 12/2018 Siessegger ................ G06T 7/70
2020/0374005 A1 * 11/2020 Hao ....................... H04N 5/145

OTHER PUBLICATIONS

Maheepala et al., "Light-Based Indoor Positioning Systems: A Review," IEEE Sensors Journal, vol. 20, No. 8, Total 27 pages (Apr. 15, 2020).
Afzalan et al., "Indoor Positioning Based on Visible Light Communication: A Performance-based Survey of Real-world Prototypes," ACM Computing Surveys (CSUR), vol. 52, No. 2, total 36 pages (May 2019).
Kuo et al., "Luxapose: Indoor Positioning with Mobile Phones and Visible Light," Proceedings of the 20th annual international conference on Mobile computing and networking, ACM, 2014, total 12 pages (Sep. 7-11, 2014).
Fang et al., "High Speed Indoor Navigation System based on Visible Light and Mobile Phone," Journal of Latex Class Files, vol. 14, No. 8, total 8 pages, IEEE—Institute of Electrical and Electronics Engineers, New York, New York (Aug. 2015).
Huang et al., "Indoor imaging visible light positioning with sampled sparse light source and mobile device," Chinese Optics Letters, COL 14(9), 090602 (2016), total 5 pages (Sep. 10, 2016).
Hosseinianfar et al., "GOPA: Geometrical Optics Positioning Algorithm Using Spatial Color Coded LEDs (Extended Version)," arXiv:1807.06931v1 [eess.SP], total 10 pages (Jun. 24, 2018).
Zhang et al., "Image Sensor Based Visible Light Positioning System with Improved Positioning Algorithm," Journal of Latex Class Files, vol. 14, No. 8, total 7 pages, IEEE—Institute of Electrical and Electronics Engineers, New York, New York (Aug. 2015).
Zhu et al., "Enabling High-Precision Visible Light Localization in Today's Buildings," ACM SIGMOBILE International Conference on Mobile Systems, Applications, and Services (MobiSys) total 13 pages (Jun. 19-23, 2017).
Huynh et al., "VLC-Based Positioning System for an Indoor Environment Using an Image Sensor and an Accelerometer Sensor," Sensors 2016, 16, 783, total 16 pages (May 28, 2016).
Rahman et al., "High Precision Indoor Positioning Using Lighting LED and Image Sensor," Proceedings of 14th International Conference on Computer and Information Technology (ICCIT 2011), Dhaka, Bangladesh, total 6 pages (Dec. 22-24, 2011).
Yasir et al., "Indoor Positioning System Using Visible Light and Accelerometer," Journal of Lightwave Technology, vol. 32, No. 19, DOI: 10.1109/JLT.2014.2344772, total 12 pages, IEEE—Institute of Electrical and Electronics Engineers, New York, New York (Oct. 1, 2014).

* cited by examiner

POSITIONING SYSTEM BASED ON AN IMAGE CAPTURING MODULE WITHIN A RECEIVER

CROSS-REFERENCE TO RELATED APPLICATIONS

This application is a continuation of International Application No. PCT/CN2021/139347, filed on Dec. 17, 2021, which claims priority to Singaporean Patent Application No. 10202012843X, filed on Dec. 21, 2020. The disclosures of the aforementioned applications are hereby incorporated by reference in their entireties.

TECHNICAL FIELD

Embodiments of this application relate to a system for determining a location of a receiver in an enclosed space whereby its location is obtained based on information associated with at least three transmitters that are provided within the enclosed pace. In particular, once the images of the transmitters are captured by an image capturing module provided within the receiver, the receiver is configured to process the captured image, and based on the outcome of this process, to determine its location in the enclosed space.

BACKGROUND

It is challenging to implement an indoor positioning system as compared to an outdoor positioning system because indoor systems have relatively high accuracy requirements (<1 m). Furthermore, indoor positioning systems do not have dedicated infrastructure to support beacons for transmission of signals for positioning unlike outdoor positioning systems which may rely on GPS and its equivalent signals for outdoor positioning.

To address this problem, those skilled in the art have proposed the use of a system that employs a rolling shutter method such as a Luxapose system. In this system, a light emitting diode (LED) light is configured to switch on and off rapidly (e.g. around 200 Hz) at a speed that is not noticeable by the human eye. However, when this image is captured by a camera, it may appear like a fringe pattern. This occurs because the CMOS sensors in a camera scans images column-by-column. As such, when the light sources generate different on/off signals, different fringe patterns can be captured by the camera. By exploiting this property, different light sources may then be identified.

Unfortunately, when the light sources are located further away from the camera, the light sources become blur due to the camera's limited focal length. When this happens, the captured patterns may become unclear. Additionally, this system typically requires three or more beacons (ideally at least four) to be captured individually by the camera. In other words, all the beacons have to be within the field of view (FoV) of the camera in order for this to happen. Due to the limited field of view of the camera, this condition may not be easily satisfied.

Those skilled in the art have also proposed that the system above may be improved through the use of LEDs that have sufficiently large surface areas, e.g. LEDs that have a diameter of 17.5 cm and an output power of 18 W. This is to ensure that the LEDs may be clearly seen by the camera. However, due to the limited FoV of the camera, this increase in the diameter of the LEDs are problematic, as the entirety of the LEDs may not be captured by the camera. Another issue associated with this approach is that the camera's design has to be more complex as image processing techniques have to be employed to extract the required information from the fringe pattern. Furthermore, the camera would have to cater for various scenarios such as when the camera is far away from the light source, the captured image would be compressed causing the fringes to become close together. Further, if the image is out of the camera's focus, it may be even more difficult for the camera to process these fringes.

In yet another method proposed by those skilled in the art, the proposed method requires a camera to capture an image of a reference light source and subsequently find five reference points on the captured image. However, this method will only work if the light source is always in the camera's focus and will not work if the image is out of focus. As expected, this method requires a more complicated image processing technique and also assumes that the azimuth angle between the global coordinate system and the camera's coordinate system is known.

For the above reasons, those skilled in the art are constantly looking for a camera positioning system that does not require a complex camera/receiver, utilizes a simple low-cost transmitter design whereby communication links between the transmitters are not required.

SUMMARY

The above and other problems are solved and an advance in the art is made by the apparatus and methods provided by embodiments in accordance with the application.

A first advantage of the embodiments of the application is that the application may utilize existing smartphones as the receiver of the system without any hardware modifications being made to the smartphone.

A second advantage of embodiments of the application is that the application uses a simple angle of arrival (AOA) method, rather than complicated image processing techniques, to compute the receiver's position.

A third advantage of the embodiments of the application is that the transmitters are standalone and two-way communication means are not required to be set up and maintained between the transmitters and the receiver thereby simplifying the implementation of the system.

A fourth advantage of the embodiments of the application is that the main larger transmitter in the arrangement may utilize existing lighting means in a room, e.g. a room's existing lighting source, and does not require major hardware modifications to be made to the existing lighting means. Further, through the use of existing light means, this implies that users of the application will not be distracted by the introduction of unsightly additional light sources in the enclosed space.

A fifth advantage of embodiments of the application is that once the main transmitter has been detected by the receiver, the secondary smaller transmitter in the arrangement may then easily be subsequently detected as its position would be adjacent the main transmitter.

A sixth advantage of the embodiments of the application is that the transmitter arrangement is distinguishable from its mirror image and hence, avoids false identification of transmitters.

The above advantages are provided by embodiments of a device and method in accordance with the application operating in the following manner.

According to a first aspect of the application, a module provided within a receiver for determining a location of the receiver in an enclosed space is disclosed, the module comprising: an image capturing module configured to capture an image of at least two transmitters that are provided within the enclosed space; and a processing module configured to: generate a rotational matrix based on measurements obtained from a pre-calibrated inertial measurement unit (IMU) provided within the receiver; identify, from the captured image, a unique arrangement associated with the at least two transmitters whereby the unique arrangement is used to determine locations of each of the transmitters in the enclosed space; for each of the transmitters, compute AOA via a line of sight (LOS) unit vector from the receiver to a location of the transmitter on an image plane of the image capturing module based on the location of the transmitter on the image plane and based on a focal length of the image capturing module; convert the LOS unit vectors from the receiver's coordinate system to a global coordinate system using the rotational matrix; and estimate the location of the receiver using a maximum-likelihood estimate scheme, the locations of each of the transmitters, and the LOS unit vectors associated with each of the transmitters.

With regard to the first aspect of the application, at least two transmitters comprise a first transmitter that is larger in size than a second transmitter.

With regard to the first aspect of the application, the first transmitter comprises a transmitter configured to emit a monochromatic light, and the second transmitter being configured to emit a coloured light.

With regard to the first aspect of the application, the processing module being configured to identify the unique arrangement associated with the at least two transmitters comprises the processing module being further configured to: determine, from a database communicatively linked to the module, an arrangement of transmitters that match with the identified unique arrangement associated with the at least two transmitters, and obtain from the database, locations of all the transmitters in the determined arrangement of transmitters.

With regard to the first aspect of the application, each LOS unit vector representing AOA from the receiver to a transmitter is defined as:

$$\hat{V} = \frac{V}{|V|}$$

where V=(x, y, z), z is defined as the focal length of the image capturing module, and x and y define the location of the transmitter on an image plane of the image capturing module with regard to the centre of the image plane.

With regard to the first aspect of the application, the maximum-likelihood estimate scheme comprises a least square method.

According to a second aspect of the application, a method for determining a location of a receiver in an enclosed space using a module provided within a receiver is disclosed, the method comprising: capturing, using an image capturing module provided within the module, an image of at least two transmitters that are provided within the enclosed space; generating, using a processing module provided within the module, a rotational matrix based on measurements obtained from a pre-calibrated inertial measurement unit (IMU) provided within the receiver; identifying, using the processing module, from the captured image, a unique arrangement associated with the at least two transmitters whereby the unique arrangement is used to determine locations of each of the transmitters in the enclosed space; computing, using the processing module, for each of the transmitters, an angle of arrival (AOA) as a line of sight (LOS) unit vector from the receiver to a location of the transmitter on an image plane of the image capturing module based on the location of the transmitter on the image plane and based on a focal length of the image capturing module; converting, using the processing module, the LOS unit vectors from the receiver's coordinate system to a global coordinate system using the rotational matrix; and estimating, using the processing module, the location of the receiver using a maximum-likelihood estimate scheme, the locations of each of the transmitters, and the LOS unit vectors associated with each of the transmitters.

With regard to a second aspect of the application, the at least two transmitters comprise a first transmitter that is larger in size than a second transmitter.

With regard to a second aspect of the application, the first transmitter comprises a transmitter configured to emit a monochromatic light, and the second transmitter being configured to emit a coloured light.

With regard to a second aspect of the application, the identifying the unique arrangement associated with the at least two transmitters further comprises: determining, from a database communicatively linked to the module, an arrangement of transmitters that match with the identified unique arrangement associated with the at least two transmitters, and obtaining from the database, locations of all the transmitters in the determined arrangement of transmitters.

With regard to a second aspect of the application, each LOS unit vector from the receiver to a transmitter is defined as:

$$\hat{V} = \frac{V}{|V|}$$

where V=(x, y, z), z is defined as the focal length of the image capturing module, and x and y define the location of the transmitter on an image plane of the image capturing module with regard to the centre of the image plane.

With regard to a second aspect of the application, the maximum-likelihood estimate scheme comprises a least square method.

BRIEF DESCRIPTION OF THE DRAWINGS

The above advantages and features in accordance with this application are described in the following detailed description and are shown in the following drawings.

DETAILED DESCRIPTION

The present application will now be described in detail with reference to several embodiments thereof as illustrated in the accompanying drawings. In the following description, numerous specific features are set forth in order to provide a thorough understanding of the embodiments of the present application. It will be apparent, however, to one skilled in the art, that embodiments may be realised without some or all of the specific features. Such embodiments should also fall within the scope of the current application. Further, certain process steps and/or structures in the following may not have been described in detail and the reader will be referred to a corresponding citation so as to not obscure the present application unnecessarily.

Further, one skilled in the art will recognize the receiver may comprise of many functional units such as an image capturing module, a processing module and/or an inertial measure unit that may be labelled as modules/units throughout the specification. The person skilled in the art will also recognize that a module may be implemented as circuits, logic chips or any sort of discrete component and that the receiver may be made up of many different modules. Still further, one skilled in the art will also recognize that a module may be implemented in software which may then be executed by a variety of processors. In embodiments of the application, a module may also comprise computer instructions or executable code that may instruct a computer processor to carry out a sequence of events based on instructions received. The choice of the implementation of the modules is left as a design choice to a person skilled in the art and does not limit the scope of this application in any way.

Figure 1:
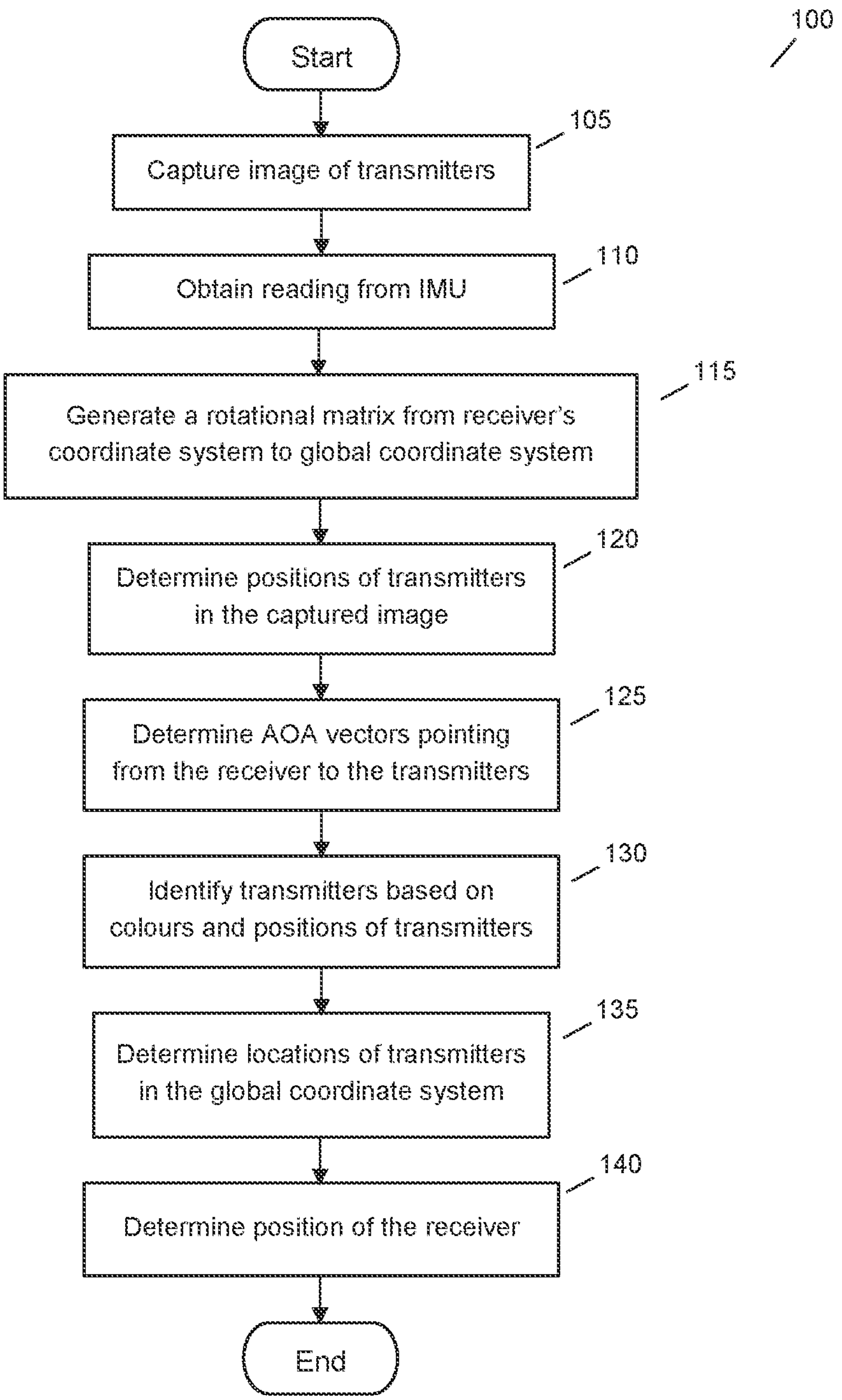
FIG. 1 illustrating a process carried out by a receiver to determine a position of the receiver in accordance with embodiments of the application.

FIG. 1 sets out an exemplary flowchart of process 100 for capturing images of transmitters using an image capturing module provided within a receiver and determining the receiver's position based on the identified transmitters in accordance with embodiments of the application. Process 100 which is performed by a module provided within a receiver comprises an image capturing module and a processing module both being configured to carry out the following steps:

Step 105: capture image of transmitters;

Step 110: obtain a reading from an inertial measurement unit (IMU);

Step 115: generate a rotational matrix from measurements taken from the IMU to convert from a receiver's coordinate system to a global coordinate system;

Step 120: determine positions of transmitters in the captured images;

Step 125: determine AOAs as line of sight vectors pointing from the receiver to the transmitters and align the line of sight vectors using the rotational matrix obtained in step 115;

Step 130: identify transmitters based on colours and/or positions of transmitters;

Step 135: determine positions of the transmitters in the global coordinate system; and Step 140: determine a location of the receiver.

In general, the system for determining a location of a receiver in an enclosed area such as a room, comprises of a module provided within the receiver whereby the module further comprises an image capturing module, and a processing module. The system also includes at least two transmitters that are provided within the enclosed area. In embodiments of the application, the transmitters are standalone and do not need to be synchronized or communicatively linked to the receiver and are attached to an upper surface of a room, such as the ceiling or the upper part of a wall. Additionally, the main transmitter in the arrangement may comprise existing lighting means for the enclosed area such as, but not limited to, light emitting diodes (LEDs), light bulbs, spotlights, and any other light sources. By using existing lighting means, this avoids the need for unsightly light transmitters to be installed within the enclosed space.

Figure 2:
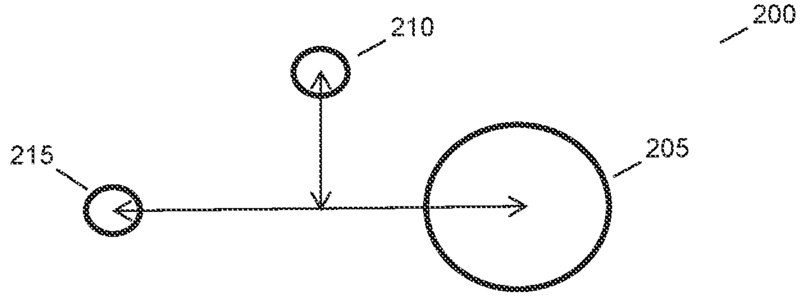
FIG. 2 illustrating a block diagram representative of transmitters in accordance with embodiments of the application.

An exemplary block diagram of the transmitters are illustrated in FIG. 2. FIG. 2 illustrates transmitter 205 which may comprise a light emitting diode (LED) and two other transmitters 210 and 215 which may comprise smaller LEDs (relative to transmitter 205). In embodiments of the application, transmitter 205 may also comprise a white LED while transmitters 210 and 215 may comprise coloured LEDs. One skilled in the art will recognize that transmitter 205 may comprise of any monochromatic coloured LED without departing from the application. The difference in sizes between transmitter 205 and transmitters 210, 215 ensures that mirror images of these transmitters are distinguishable. It should also be noted that the arrangement of the transmitters relative to each other and the colour combinations of these transmitters may be used to differentiate the various transmitter arrangements from each other. For example, when three (3) different transmitters are used, this implies that there could be $7^2$ types of different transmitter arrangements (i.e. the number '7' is derived from the 8 states in which a coloured transmitter (e.g. RGB LED) may be set, with the "all switched off" state being removed from the 8 states, while the number '2' refers to the number of coloured transmitters (where the third transmitter is configured to emit a monochrome colour). One skilled in the art will also recognize that at the minimum, two transmitters are required and any additional number of transmitters may be added to the system without departing from the application. Additionally, the detection of the main transmitter 205 in the image helps narrow down the search space in the image for either transmitter 210 or 215 as transmitters 210 and/or 215 would be provided adjacent to transmitter 205, in the arrangement.

Transmitters 205, 210 and 215 may be configured to output a constant light intensity or if required, they may be configured to transmit information about their locations by adding a driver to one of the transmitters so that visible light communication schemes may be added to control the intensity of the transmitter's emitted light. In embodiments of the application, the driver may be added to the largest of the three transmitters, i.e. transmitter 205.

In embodiments of the application, transmitter 205 may comprise a monochromatic light emitted LED such as a white LED that consumes around 5 Watts and this LED may be used for illumination and as an anchor for positioning. As for transmitters 210 and/or 215, these coloured LEDs are always ON and typically comprise common low-powered LEDs which consume around 60 mW each, and typically have wide viewing angles, e.g. around 120°.

In embodiments of the application, the receiver may comprise, but is not limited to, a typical smartphone having an inertial measurement unit (IMU) module, and the image capturing module may comprise a front facing camera and/or a rear facing camera of the smartphone. The IMU module comprises an electronic device that measures and reports a force applied to the smartphone, the smartphone's angular rate and orientation and this is usually accomplished using a combination of accelerometers, gyroscopes and/or magnetometers. The detailed working of the IMU module is omitted for brevity as its detailed workings are known to one skilled in the art.

With reference to FIG. 1, process 100 illustrates a process for capturing images of transmitters attached to an upper surface of a room and for determining a receiver's position in the room based on the images of the identified transmitters. Process 100 may be carried out using an image capturing module and/or a processing module that are both provided within the module in the receiver.

Process 100 begins at step 105. At this step, process 105 will first capture the image of the transmitters. The image capturing module within the receiver may be set to have a shutter speed of at least 1/8000 seconds or faster so that the captured image's quality may be retained even though the receiver is not maintained at a static position when the images of the transmitters are captured. With this shutter speed, this also ensures that other objects surrounding the transmitters would not be captured as they would appear blurry and dim in the captured image. In embodiments of the application, the ISO of the camera will be set to a low range, between 50-100 so that the transmitters would stand out from the background of the captured image.

Process 100 then proceeds to step 110 whereby the readings from the receiver's IMU which has been pre-calibrated with the receiver are obtained. In embodiments of the application, readings such as, but not limited to, the receiver's angular rate and orientation may be obtained from the IMU at this step. At the next step, i.e. step 115, process 100 will then generate a rotational matrix from the readings obtained from the IMU. The rotational matrix is required as it will be used to transform a vector that is defined in the receiver's coordinate system to a vector that is defined in the global coordinate system, i.e. the room's coordinate system. In embodiments of the application, the rotational matrix may be set up and obtained directly from measurements generated by the receiver's IMU.

As mentioned above, the rotational matrix may be used to convert a receiver's coordinate system to a room's coordinate system and this matrix typically comprises of three components: roll, pitch and yaw. Roll and pitch can be obtained from an accelerometer provided within the receiver while yaw can be obtained from a magnetometer provided within the receiver. A line of sight (LOS) vector representing AOA, obtained between the receiver and a transmitter may be rotated using this rotational matrix and the details of this rotation is omitted for brevity as it is known to one skilled in the art.

Magnetometer readings can be affected by local magnetic disturbances from surrounding metal objects in the room. As such, in accordance with embodiments of the application, only the accelerometer in the receiver may be used to compute the roll and pitch component of the rotational matrix. In such a scenario, When a LOS vector is rotated using such a rotational matrix, it will not be aligned in the yaw dimension. Hence a grid search over the full range of yaw i.e. 0~2*pi, is done one as part of receiver position computation. For each value of yaw that is selected from a fine grid from 0~2*pi, the receiver position and the residuals are computed whereby the solution that produces the least sum square of residuals is selected as the final position. The least squares method is used as the maximum-likelihood estimate scheme to arrive at a close approximation of the final position At step 120, process 100 will then determine the positions of the transmitters relative to each other in the captured image. Process 100 will search through the captured image to identify points within the image that may comprise transmitters associated with the system. In embodiments of the application, this may be done by comparing the arrangement of the identified points in the captured image with images of known transmitter configurations or unique transmitter arrangements as contained within a preloaded database provided within the receiver. This database may also be located on a server or a remote database and the receiver may be configured to exchange information with this database either through wireless communication means or wired communication means. Once the transmitters have been identified in the captured image, process 400 then proceeds to step 125.

At this step, process 100 will determine angle of arrivals as LOS unit vectors that are pointing from the receiver to each of the transmitters. It should be noted that these vectors will initially be based on the receiver's coordinate system and will have to be transformed thereafter to the global coordinate system and this may be done using the rotational matrix previously described above. (Note that it is assumed that receiver is aware of the intrinsic rotation between the IMU and the image capturing module inside the receiver, and this intrinsic rotation is taken into account for in the total rotation between the receiver's coordinate system and the global coordinate system)

Figure 3:
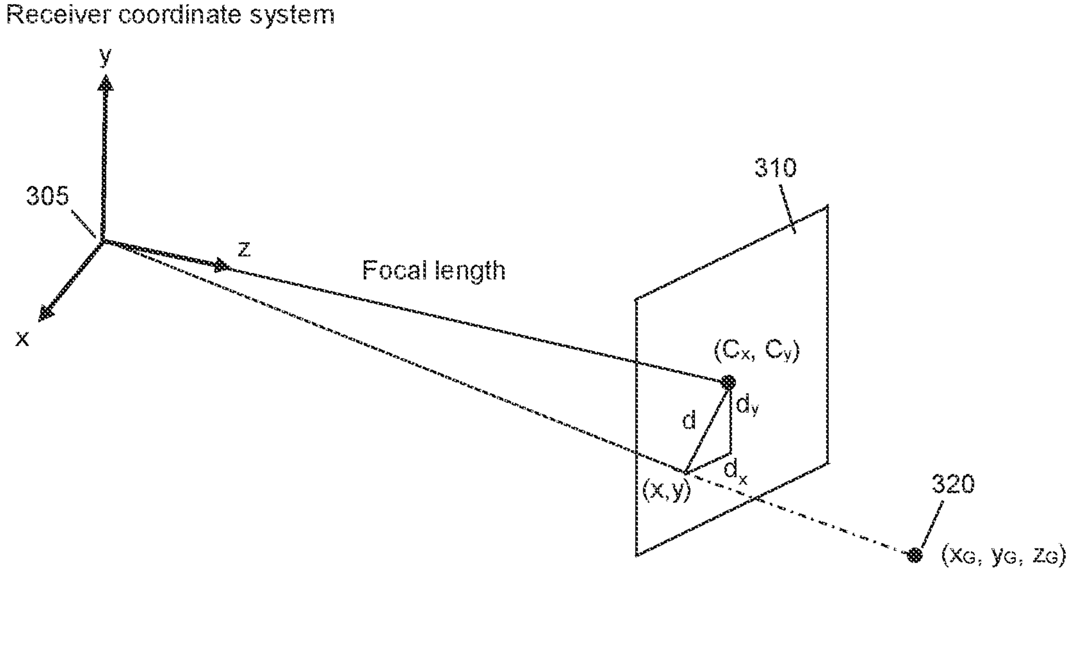
FIG. 3 illustrating the receiver's perspective camera model based on the receiver's coordinate system in accordance with embodiments of the application.

With reference to FIG. 3, a LOS vector in the receiver's coordinate system is defined as a vector from the focal point 305 of the receiver (i.e. from the focal point of the image capturing module) to the location of transmitter 320 on image plane 310. As such, coordinates (x, y) represent the location of transmitter 320 at image plane 310 with respect to the centre ($C_x$, $C_y$) of image plane 310. As the focal length of the receiver to image plane 310 is known (i.e. this parameter is an intrinsic parameter of the receiver), the LOS vector to transmitter 320 in the receiver's coordinate system may be defined as V=(x, y, z). The LOS vector may then be normalized to produce a unit vector, $\hat{V}$ defined as:

$$\hat{V} = \frac{V}{|V|}$$

Where |V| is the norm of V.

One skilled in the art will recognize that the computations used to generate the LOS unit vector for transmitter 320 may be similarly applied to obtain the LOS unit vectors for other transmitters, e.g. transmitters 205, 210 and 215, without departing from the application.

The rotational matrix is then applied to these LOS unit vectors to convert the LOS unit vectors that were defined in the receiver's coordinate system to a vector that is defined in the global coordinate system, i.e. the room's coordinate system.

Process 100 then proceeds to step 130 whereby based on the colours and positions/arrangements of the transmitters (relative to each other), process 100 will then determine the locations of the transmitters in the global coordinate system at step 135. The positions of these transmitters will be based on the global or the room's coordinate system. In embodiments of the application, the receiver will be preloaded with a database that contains all the transmitter configurations (i.e. their arrangements and colour combinations) along with each transmitter's associated location in the room. For example, for transmitter configuration 200 as illustrated in FIG. 2, transmitter 205 may be associated with a particular ($x_1$, $y_1$, $z_1$) location, transmitter 210 may be associated with a particular ($x_2$, $y_2$, $z_2$) location, and transmitter 215 may be associated with a particular ($x_3$, $y_3$, $z_3$) location whereby these locations are all based on the room's coordinate system. In other embodiments of the application, the transmitters may be configured to broadcast their locations to the receiver through wireless communications means such as, but not limited to, Bluetooth, Wi-Fi and/or cellular networks.

Once the locations of the transmitters in the global coordinate system have been determined, process 100 then proceeds to step 140 to determine the position of the receiver in the global coordinate system by estimating the position of the receiver based on a maximum-likelihood estimate scheme that is computed using the LOS unit vectors and the locations of the transmitters. In embodiments of the application, the estimated position of the receiver may be obtained using a least squares method to solve the LOS unit vectors to arrive at a maximum-likelihood estimate of the position of the receiver.

In other words, if $\hat{V}_{205}$ is a LOS unit vector from the receiver to transmitter 205 whereby the location $t_{205}=(x_{205}, y_{205}, z_{205})$ was obtained from the previous step, if 17210 is a LOS unit vector from the receiver to transmitter 210 whereby the location $t_{210}=(x_{210}, y_{210}, z_{210})$ was obtained from the previous step and if $\hat{V}_{215}$ is a LOS unit vector from the centre of the receiver to transmitter 215 whereby the location $t_{215}=(x_{215}, y_{215}, z_{215})$ was obtained from the previous step, the estimated position of the receiver can be obtained by using a maximum-likelihood estimate scheme with the values above. A maximum-likelihood estimate scheme that may be used comprises, but is not limited to, a least squares method or any other similar nonlinear/linear regression methods. The detailed working of the maximum-likelihood estimate scheme is omitted for brevity as its detailed workings are known by one skilled in the art.

Further, one skilled in the art will recognize that the steps in process 100 are interchangeable and are not limited to the sequence illustrated in FIG. 1.

Step 140 is best explained using the following example.

For example, assume that 'z' is defined as the unknown location of the receiver in a room having three transmitters $T_1$, $T_2$, and $T_3$, and that $t_1$, $t_2$, and $t_3$ are the locations of transmitters $T_1$, $T_2$, and $T_3$, respectively in the global coordinate system, $\hat{V}_1$, $\hat{V}_2$, $\hat{V}_3$ are the LOS unit vectors pointing from the receiver to transmitters $T_1$, $T_2$, and $T_3$, respectively in the global coordinate system and that $r_1$, $r_2$, and $r_3$ are the unknown distances from the receiver to transmitters $T_1$, $T_2$, and $T_3$, respectively. As such, the following may be defined:

$$t_1=z+(r_1\cdot\hat{V}_1)$$

$$\therefore t_1-z=r_1\cdot\hat{V}_1$$

Due to the fact that $t_1$, z and $\hat{V}_1$ are in the same plane, $$(t_1-z)\times\hat{V}_1=0,$$

This equation is valid as its cross product function will be zero in the absence of measurement noise. It is useful to note that 'x' refers to a cross product function.

Hence, when the equation is rearranged, this results in:

$$t_1\times\hat{V}_1=z\times\hat{V}_1$$

Hence, for transmitter $T_1$, $\alpha_1=B_1\cdot z$ where $a_1$ is an output of a vector product for $t_1\times\hat{V}_1$, while $B_1\cdot z$ is a vector product$b_1\times z$, where $B_1$ is a transpose of a skew symmetric matrix of $\hat{V}_1$, For transmitter $T_2$, $a_2=B_2\cdot z$, where $a_2$ is an output of a vector product for $t_2\times\hat{V}_2$, while $B_2\cdot z$ is a vector product $b_2\times z$, where $B_2$ is a transpose of a skew symmetric matrix of $\hat{V}_2$, For transmitter $T_3$, $a_3=B_3\cdot z$, where $a_3$ is an output of a vector product for $t_3\times\hat{V}_3$, while $B_3\cdot z$ is a vector product $b_3\times z$, where $B_3$ is a transpose of a skew symmetric matrix of $\hat{V}_3$.

Based on the above $$A=\begin{bmatrix}a_1\\a_2\\a_3\end{bmatrix};\ B=\begin{bmatrix}B_1\\B_2\\B_3\end{bmatrix}.$$

Hence when A=B·z, the resulting location of the receiver, z, may be obtained from the least squares estimate as z=inverse (B'·B)·B'·A, where inverse ( ) is an inverse matrix and B' is a transpose of B.

The above is a description of embodiments of a system and a method in accordance with the present application as set forth in the following claims. Whilst certain features of the application have been illustrated and described herein, many modifications, substitutions, changes and equivalents will now occur to those of ordinary skill in the art. It is therefore to be understood that the appended claims are intended to cover all such modifications and changes as fall within the true spirit of the application.

What is claimed is:

1. An apparatus provided within a receiver for determining a location of the receiver in an enclosed space, the apparatus comprising:

at least one camera configured to capture an image of at least two transmitters that are provided within the enclosed space; and a processor configured to:

generate a rotational matrix based on measurements obtained from a pre-calibrated inertial measurement unit (IMU) provided within the receiver, wherein a roll component and a pitch component of the rotational matrix are computed using an accelerometer in the receiver;

identify, from the captured image, a unique arrangement associated with the at least two transmitters, wherein the unique arrangement is used to determine locations of each of the at least two transmitters in the enclosed space;

for each of the at least two transmitters, compute an angle of arrival (AOA) as a line of sight (LOS) unit vector from the receiver to a location of the transmitter on an image plane of the at least one camera based on the location of the transmitter on the image plane and based on a focal length of the at least one camera;

convert the LOS unit vectors from a receiver's coordinate system to a global coordinate system using the rotational matrix, wherein the rotational matrix aligns the LOS unit vectors in a roll dimension and a pitch dimension, and wherein the converted LOS unit vectors comprise an unresolved yaw component; and estimate the location of the receiver using a maximum-likelihood estimate scheme, the locations of each of the at least two transmitters in the enclosed space, and the LOS unit vectors associated with each of the at least two transmitters; wherein estimating the location of the receiver comprises determining the unresolved yaw component by performing a grid search over a full range of yaw.

2. The apparatus according to claim 1, wherein the at least two transmitters comprise a first transmitter that is larger in size than a second transmitter.

3. The apparatus according to claim 2, wherein the first transmitter comprises a transmitter configured to emit a monochromatic light, and the second transmitter is configured to emit a coloured light.

4. The apparatus according to claim 1, wherein in identifying the unique arrangement associated with the at least two transmitters, the processor is further configured to:

determine, from a database communicatively linked to the apparatus, an arrangement of transmitters that match with the identified unique arrangement associated with the at least two transmitters, and obtain, from the database, locations of all the transmitters in the determined arrangement of transmitters.

5. The apparatus according to claim 1, wherein each LOS unit vector $\hat{V}$ from the receiver to the location of the transmitter on the image plane is defined as:

$$\hat{V} = \frac{V}{|V|}$$

wherein V=(x, y, z), z is defined as the focal length of the at least one camera, and x and y define the location of the transmitter on the image plane of the at least one camera with regard to a centre of the image plane, wherein V is a LOS vector to the transmitter in the receiver's coordinate system, and |V| is the norm of V.

6. The apparatus according to claim 1, wherein the maximum-likelihood estimate scheme comprises a least square method.

7. The apparatus according to claim 1, wherein the at least one camera is configured to have a shutter speed of at least 1/8000 seconds.

8. The apparatus according to claim 1, wherein the at least one camera is configured to have an ISO range between 50 and 100.

9. The apparatus according to claim 1, wherein in performing the grid search over the full range of yaw, the processor is configured to: compute the location of the receiver and residuals for each value of yaw selected from a grid from 0 to 2*pi; and select a solution that produces a least sum square of residuals as a final position of the receiver.

10. The apparatus according to claim 1, wherein the receiver comprises a smartphone, and the at least one camera comprises a front facing camera or a rear facing camera of the smartphone.

11. A method for determining a location of a receiver in an enclosed space, wherein the method is implemented by an apparatus provided within the receiver, and the method comprises:

capturing, by at least one camera provided within the apparatus, an image of at least two transmitters that are provided within the enclosed space;

generating, by a processor provided within the apparatus, a rotational matrix based on measurements obtained from a pre-calibrated inertial measurement unit (IMU) provided within the receiver, wherein a roll component and a pitch component of the rotational matrix are computed using an accelerometer in the receiver;

identifying, by the processor, from the captured image, a unique arrangement associated with the at least two transmitters whereby the unique arrangement is used to determine locations of each of the at least two transmitters in the enclosed space;

computing, by the processor, for each of the at least two transmitters, an angle of arrival (AOA) as a line of sight (LOS) unit vector from the receiver to a location of the transmitter on an image plane of the at least one camera based on the location of the transmitter on the image plane and based on a focal length of the at least one camera;

converting, by the processor, the LOS unit vectors from a receiver's coordinate system to a global coordinate system using the rotational matrix, wherein the rotational matrix aligns the LOS unit vectors in a roll dimension and a pitch dimension, and wherein the converted LOS unit vectors comprise an unresolved yaw component; and estimating, by the processor, the location of the receiver using a maximum-likelihood estimate scheme, the locations of each of the at least two transmitters in the enclosed space, and the LOS unit vectors associated with each of the at least two transmitters; wherein estimating the location of the receiver comprises determining the unresolved yaw component by performing a grid search over a full range of yaw.

12. The method according to claim 11, wherein the at least two transmitters comprise a first transmitter that is larger in size than a second transmitter.

13. The method according to claim 12, wherein the first transmitter comprises a transmitter configured to emit a monochromatic light, and the second transmitter is configured to emit a coloured light.

14. The method according to claim 12, wherein the identifying the unique arrangement associated with the at least two transmitters comprises detecting the first transmitter in the image to narrow down a search space in the image for the second transmitter.

15. The method according to claim 11, wherein the identifying the unique arrangement associated with the at least two transmitters further comprises:

determining, from a database communicatively linked to the apparatus, an arrangement of transmitters that match with the identified unique arrangement associated with the at least two transmitters, and obtaining, from the database, locations of all the transmitters in the determined arrangement of transmitters.

16. The method according to claim 11, wherein each LOS unit vector from the receiver to the location of the transmitter on the image plane is defined as:

$$\hat{V} = \frac{V}{|V|}$$

wherein V=(x, y, z), z is defined as the focal length of the at least one camera, and x and y define the location of the transmitter on the image plane of the at least one camera with regard to a centre of the image plane, wherein V is a LOS vector to the transmitter in the receiver's coordinate system, |V| is the norm of V.

17. The method according to claim 11, wherein the maximum-likelihood estimate scheme comprises a least square method.

18. The method according to claim 11, wherein the capturing the image comprises capturing the image using a shutter speed of at least 1/8000 seconds.

19. The method according to claim 11, wherein the performing the grid search over the full range of yaw comprises: computing the location of the receiver and residuals for each value of yaw selected from a grid from 0 to 2*pi; and selecting a solution that produces a least sum square of residuals as a final position of the receiver.

20. The method according to claim 11, further comprising receiving, by the receiver, the locations of each of the at least two transmitters broadcasted through a wireless communication means.

* * * * *